US006808583B2

(12) United States Patent
Kwasny et al.

(10) Patent No.: US 6,808,583 B2
(45) Date of Patent: Oct. 26, 2004

(54) PROTECTIVE UNDERCOATING FOR A PRINTED MEDIUM

(75) Inventors: David M. Kwasny, Corvallis, OR (US); Mark H. Kowalski, Westford, MA (US); Vladek P Kasperchik, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/439,798

(22) Filed: May 16, 2003

(65) Prior Publication Data

US 2003/0194524 A1 Oct. 16, 2003

Related U.S. Application Data

(62) Division of application No. 09/630,318, filed on Jul. 31, 2000, now abandoned.

(51) Int. Cl.[7] .......................... B44C 1/165; B65C 9/00; B32B 31/20; B41M 3/12

(52) U.S. Cl. ....................... 156/230; 156/238; 156/247; 156/277; 156/289; 156/540; 156/582; 428/914

(58) Field of Search ................................ 156/230, 234, 156/237, 238, 240, 239, 241, 247, 277, 289, 540, 580, 587, 583.1, 581; 427/146, 147, 148; 428/40.1, 41.7, 41.8, 42.3, 343, 195, 200, 202, 203, 914

(56) References Cited

U.S. PATENT DOCUMENTS

| | | | | | |
|---|---|---|---|---|---|
| 4,853,706 | A | * | 8/1989 | Van Brimer et al. | 347/102 |
| 5,441,838 | A | | 8/1995 | Pane | |
| 5,555,011 | A | | 9/1996 | Tang et al. | |
| 5,798,161 | A | | 8/1998 | Kita et al. | |
| 5,942,330 | A | * | 8/1999 | Kelley | 428/423.1 |
| 6,095,220 | A | * | 8/2000 | Kobayashi et al. | 156/540 |
| 6,264,296 | B1 | * | 7/2001 | Klinefelter et al. | 347/4 |

FOREIGN PATENT DOCUMENTS

| | | |
|---|---|---|
| EP | 1 122 088 | 8/2001 |
| JP | 60189486 | 9/1985 |
| JP | 10297126 | 11/1998 |
| JP | 11240265 | 9/1999 |
| WO | WO 95/30547 | 11/1995 |

* cited by examiner

*Primary Examiner*—J. A. Lorengo

(57) ABSTRACT

A transparent, protective undercoat for a printed medium achieved with a thermal transfer material on a carrier ribbon that is heated and pressed to transfer a segment of thermal transfer material from the carrierribbon onto the printable surface of a medium.

12 Claims, 3 Drawing Sheets

PROTECTIVE UNDERCOATING FOR A PRINTED MEDIUM

This is a divisional of application No. 09/630,318 filed on Jul. 31, 2000 now abandoned, which is hereby incorporated by reference herein.

FIELD OF INVENTION

The present invention relates to a clear protective undercoat for a printed medium, achieved with a thermal transfer material and a carrier ribbon forming a donor web which is subjected to heat and pressure to transfer a segment of thermal transfer material from the donor web onto the printed area on the printable surface of a medium.

BACKGROUND OF INVENTION

Digital photography and imaging provide cost-effective alternatives for capturing images, but known methods of producing durable, hardcopy prints of digitally printed areas are at least as expensive as traditional photographic methods. Further, with increasing use of various printing and imaging technologies in the publishing industry as well as in the home, protecting imaged or printed documents against abrasion, water alcohol, other liquid spills, ink smear, fading, blocking or other image-degradation processes and effects has become an important consideration. Such protection is particularly desirable for printed or imaged documents produced with water-based (water-soluble) or other liquid inks, as well as documents printed or imaged with toner. These are commonly used in ink-jet printing, offset printing, electrophotography and the like.

Photography provides an easy and reliable way to permanently capture images for a variety of uses. While photographs provide durable images, they are prone to scratches, have poor resistance to light and ultraviolet radiation (which causes photographic images to fade over time), and degrade when exposed to water, other liquids or to vapors of such liquids. Traditional photography uses harsh and expensive chemicals, requires silver recovery, and involves a process requiring several intermediate steps of handling negatives. While photographic processes can be automated, such automatic processing machines are expensive and bulky and do not eliminate the inherent problems of chemical exposure and handling negatives. Additionally, producing large prints (larger than the traditional 3-by-5 inch or 4-by-6 inch prints) can be quite expensive.

Hot and cold laminates are the most common methods used to protect printed areas. However, laminates tend to be expensive, typically costing 6 to 80 cents per square foot for materials. The labor-intensive nature of producing durable prints via lamination also increases the cost of such prints. Laminates may be applied on one or both surfaces of the print. One-sided lamination may lead to excessive curling of the final print, whereas two-sided application can be very expensive in terms of material and labor costs and may excessively increase the thickness of the final print. Adhesives used for cold laminates may be tacky at room temperature, leaving a sticky residue at the edges of the prints. Additionally, binders used in creating cold laminates are typically water-based, which means the print may delaminate if exposed to excessive water or other liquid. Laminates are also susceptible to trapped air pockets, which are viewed as image defects. Most importantly, care must be taken to ensure that the laminates are accurately aligned to the media, and such alignment is especially critical for a continuous web laminate. These are just some of the deficiencies of traditional laminates.

Liquid overcoats are also commonly used to protect photographic prints and are becoming more popular as protective coatings for inkjet printed areas. Typical systems for applying these overcoats rely on roller coating or gravure type systems to dispense, gauge, and apply the coating. Smaller systems typically apply the overcoat off-line, rather than being an integral part of a single printing and coating unit. Larger systems used by the printing industry are in-line, but require extensive monitoring. Both systems require significant manual cleaning or intervention to maintain the components that contact the liquid. Liquid overcoats tend to be slightly less expensive than laminates (6–18 cents per square foot). However, because currently available systems must be cleaned frequently and regularly monitored, these methods of using liquid overcoats are just as labor-intensive as the lamination methods, if not more labor-intensive. Additionally, many of the overcoat formulations have residual odors before and/or after application, and some people find these odors offensive or even harmful.

Ultraviolet (UV) light curable liquid overcoats are also available, such as the overcoats commonly used to protect magazine covers. In such a UV-curable system, the liquid is first applied to the surface of the print and then cured to yield a solid, durable, protective coating. Because these liquids are widely used in large volumes for the magazine industry, their cost tends to be significantly lower than most other overcoat options. However, the systems used to apply such UV-curable overcoats tend to be more complicated and costly than other liquid overcoat systems, due to the multi-step application and cure process. Additionally, many of the overcoat formulations have strong odors, some of which are harmful or offensive to people. Furthermore, there are potential safety problems associated with the handling of the potentially hazardous liquids used in this process.

Malhotra (U.S. Pat. No. 5,612,777 assigned to Xerox), Tutt & Tunney (U.S. Pat. No. 5,847,738 assigned to Eastman Kodak Co.) and Tyagi et al. (U.S. Pat. No. 5,783,348 assigned to Eastman Kodak Co.) disclose methods of applying a clear, scratch-resistant, lightfast, toner coating onto printed areas. Malhotra describes photocopied color images created by first, depositing color toner on a charge retentive surface; second, depositing a clear polymer toner material onto the charge retentive surface; and third, transferring and fusing the color toner and clear polymer toner material onto a substrate. Tutt & Tunney describe a process of depositing and fusing a clear polymer toner on inkjet printed areas. Tyagi et al. describes a similar process for coating clear toner over silver halide printed areas.

Similar electrostatic coating methods are also commonly used in the commercial painting industry to powder coat products, parts, or assemblies. One powder coating method charges a powdered paint using an air gun outfitted with an electrode before spraying the charged paint onto an electrically grounded object. Alternatively, an electrically grounded object may be immersed in a charged, fluidized bed of paint particles (typically referred to as "fluidized bed powder coating").

Another Malhotra patent (U.S. Pat. No. 5,906,905 assigned to Xerox) discloses a method of creating photographic quality prints using imaging such as xerography or ink jet by, first, reverse reading toner printed areas on a transparent substrate and then adhering the transparent substrate to a coated backing sheet, coated with a polymeric lightfastness material.

The application of thermal film material on a thermally printed substrate is also disclosed. Nagashima (U.S. Pat. No.

4,738,555 assigned to Toshiba) discloses the use of a thermal printhead to thermally transfer a transparent protective layer of wax, vinyl chloride, vinyl acetate, acrylic resin, styrene or epoxy onto the thermally printed medium substrate.

Tang et al. (U.S. Pat. No. 5,555,011 assigned to Eastman Kodak) discloses a means to ensure that a thermal film that is being applied to a thermally printed surface has a clean break at the edge of the transfer. It describes a thermal film transfer method having a transport system which moves a dye-donor web and a receiver medium (i) in a forward direction along their respective paths past a thermal head, so that heat from the thermal head causes an area of the thermal film material coating between leading and trailing edges to transfer from the dye-donor web to the receiver medium and (ii) in a reverse direction along their respective paths such that the area of the thermal film material which is transferred to the receiver medium breaks cleanly at the trailing edge from a non-transferred area of the thermal film material that remains on the dye-donor web as the web support separates from the medium.

Abe et al. (U.S. Pat. No. 5,954,906 assigned to Canon) discloses a method for protecting and covering a printed material on a substrate with a pressure-sensitive protective covering material with at least (a) a first flexible substrate, (b) an adhesive layer, (c) a solid resin layer, and (d) a second flexible substrate, stacked in this order.

The packaging, printing, and decorating industry uses colored ribbons, known as thermal transfer foils, hot stamping foils, roll foils, and transfer printing foils, for marking or decorating. This market uses solid fill colored ribbons or uniquely patterned ribbons to emboss lettering, patterns, barcodes, or insignias on wood, paper, leather, plastic, fabric, or metal parts. Examples include holograms on credit cards, metalized insignias on baseball cards, corporate logos on business cards, or colored or metalized designs on greeting cards. The hot stamp foiling process involves the transfer of the coatings from a carrier ribbon onto a substrate via a combination of heat and pressure.

SUMMARY OF THE INVENTION

The present invention relates to a method of creating a non-thermally printed medium with a protective undercoat comprising:

- providing a non-thermally printed medium with a printed area;
- applying a protective undercoat over the printed area of the medium by applying heat and pressure to a donor web having a carrier side comprising a carrier material and a transfer side comprising a protective undercoat material, wherein heat and pressure applied to the transfer side facilitate release of a section of the transfer side, so that the section of the transfer side is applied over the printed area of the medium.

The present invention also relates to an undercoat for a non-thermally printed medium, the non-thermally printed medium to which the undercoat is applied, and the donor web from which the undercoat is applied to the non-thermally printed medium made by the above-described method.

The present invention relates to an apparatus comprising:

- a donor web having a carrier side comprising carrier material and a transfer side comprising protective undercoat material,
- a means of applying a protective undercoat a printed area of a non-thermally printed medium, by applying heat and pressure to the donor web, wherein the heat and pressure facilitate release of a section of the transfer side so that the section of the transfer side is applied over the printed area of the medium.

DETAILED DESCRIPTION OF THE INVENTION

Figure 1:
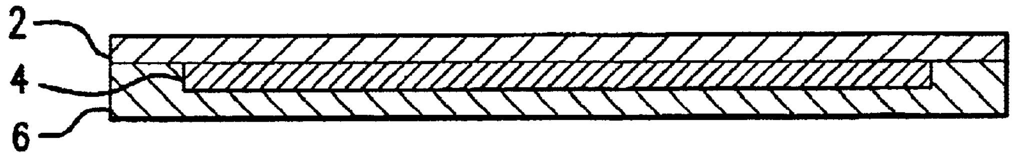
FIG. 1 is a cross sectional view of an undercoated photo quality print having a medium (2) with a printable surface on to which an image (4) is printed and a thermal transfer material undercoat (6) is also transferred to the printable surface of the medium to cover the printed image.

The present invention provides a means of creating inexpensive, durable digital prints that can compete or improve upon the quality and durability of traditional silver halide prints or other coating protected digital prints. This invention uses a thermally-transferred, opaque undercoat material, which is applied as a colorless transparent film, to protect the printed area on the media.

The undercoated media of the present invention is obtained by transferring protective undercoat from a donor web which has a top side of carrier ribbon material, the carrier ribbon material anchoring the bottom side which has at least one layer of undercoat materials. This bottom side may include a release layer, a protective undercoat material, and an adhesive layer. The protective undercoat material may be a single layer or include multiple layers. As the donor web is heated and pressed into contact with the printable surface of a medium, the protective undercoat is transferred onto the printable surface of the medium.

The protective undercoat film of the present invention improves print quality and increases durability of the printed areas. For example, the undercoat provides good protection against various substances that might spill, either in the form of liquid or dry spills, on the surface of a print. Non-limiting examples of substances which the present invention would protect against would be water, alcohol, ink, coffee, soda, ammonia based or other cleaning liquids, food stains (e.g. mustard, chocolate, berry), and dirt.

The undercoat can be applied in a way that provides, for example, a gloss finish, or a matte finish. This may be achieved through the control of the application temperature, pressure and speed. In addition, the creation of patterns using a thermal bar as the heating element can be used to create unique matte or patterned finishes.

The composition of the undercoat can be formulated to target specific properties. It can be formulated to achieve a specific gloss or matte level, and to enhance the gloss uniformity or the matte uniformity. It can also be formulated with materials or additives which improve the printed area, specifically, indoor light fade resistance, UV light fade resistance, resistance to water and other liquids, vapor resistance, scratch resistance and blocking resistance. In a preferred embodiment, the undercoat can also be formulated to have a colorless or color-tinted appearance, provide a flexible, conformable coating, decrease the required dry time, optimize the adhesion of the protective undercoat to the medium, optimize the release of the protective undercoat from the donor web, and minimize the adhesion of the protective undercoat to the base.

In addition, on the donor web there are two main sides, the carrier side comprising the carrier ribbon material and the transfer comprising the protective undercoat material. Both the carrier side and the transfer side can have other layers. There can also, for example, be layers that enhance the transfer of the protective overcoat material to the printable surface of the medium. These additional layers can include, for example, an adhesive layer positioned as the exterior layer of the protective undercoat material. The primary function of this adhesive layer is to enhance the fixation of the protective undercoat material onto the printable surface of the medium. Another example is a release layer positioned on the interior surface of the protective undercoat material next to the interior surface of the carrier ribbon material. The adhesive layer and the release layer can also include additives which enhance indoor and UV lightfade resistance, resistance to water and other liquids, vapor resistance, scratch resistance and blocking resistance in the printed images on the printable surface.

Non-limiting examples of light resisting additives that can be added to the protective undercoat material to be transferred to the printable surface of the medium in the form of an undercoating are the hindered amine series light stabilizers. The hindered amine series light stabilizer can include commercially available hindered amine series light stabilizers having a property of dispersing within a region which it can react with a dye molecule and deactivate an active species. Preferable specific examples of such hindered amine series light stabilizers include TINUVIN 292, TINUVIN 123, and TINUVIN 144 (trademarks, produced by Japan Ciba-Geigy Company).

Besides the hindered amine series light stabilizers, the thermal materials can also include UV absorbers, which can include, but are not limited to, the benzophenone series UV absorbers, benzotriazole series UV absorbers, acetanilide series UV absorbers, cyanoacrylate series UV absorbers, and triazine series UV absorbers. Specific preferred examples are commercially available acetanilide series UV absorbers such as Sanduvor UVS powder and Sanduvor 3206 Liquid (trademark names, produced by Sando Kabushiki Kaisha); and commercially available benzotriazole series UV absorbers such as TINUVIN 328, TINUVIN 900, TINUVIN 1130, and TINUVIN 384 (trademark names, produced by Japan Ciba-Geigy Company), and Sanduvor 3041 Dispersion (trademark name, produced by Sando Kabushiki Kaisha).

Non-limiting examples of liquid resistance additives or vapor resistance additives which can be added to the protective undercoat material layers, to be transferred to the printable surface of the medium in the form of an undercoating are additives that decrease the wetability of the surface by decreasing the surface energy, thereby repelling liquids such as (but not limited to) water from the surface. These additives may include the family of fluorosurfactants, silanes, siloxanes, organosiloxanes, siliconizing agents, and waxes or combinations thereof In addition to the use of additives to increase the liquid or vapor resistance, the formulation of the layers can provide improvements. Individual thin layers may develop pits or pin holes in their surface during their coating to the carrier. These holes provide avenues for liquid or vapor to travel down to the printed surface. By increasing the number of layers used to create the final undercoat, the probability of a pinhole extending all the way through the entire layer stack is decreased. In addition, this allows the individual layers to be optimized for a unique performance attribute, whereas it may not be possible to acquire as large a range of attributes from a single layer. For example, an upper layer may be optimized for gloss, and it may cover a lower layer optimized for light fade resistance. The combination of the two may be the same thickness as a single layer that has lower gloss and inferior light fade and liquid resistant properties due to the tradeoffs associated with formulating that single layer.

One of the layers in the coating may consist of material having barrier properties (i.e., having very low permeability toward gases (e.g., oxygen or water vapor)). Examples of the most widely used materials with barrier properties are co-polymers of acrylonitrile or co-polymers of vinylidene chloride. Use of materials with barrier properties in the undercoat makes it possible to dramatically increase protection of the undercoated print from humidity and fade (partially caused by oxidation of the colorants.

The total protective undercoat should be flexible. Materials should be selected such that the final film conforms to the surface of the medium. During application, the material should not crack or bread, thereby leaving blemishes, area degradations, or exposed medium. Further, the material should conform and adhere to the surface of the media during bending, flexing, or folding, as might be experienced during typical handling.

The present invention makes possible very thin individual layers on a medium that can be applied either as transparent or opaque layers. Thus, in one embodiment of the invention it is possible to apply thin protective layers as both undercoating and overcoating to a medium, achieving durability and protection of print qualities without sacrificing good optical or media qualities in the finished product.

The prints of the present invention include a transparent base material medium as a substrate for receiving an image. Some embodiments of the present invention use a completely transparent medium. Alternative embodiments use a medium having a transparent or opaque border or frame to provide additional advantages to the final printed product, such as enhanced aesthetic appeal or additional structural support (such as by a cardboard frame).

The transparent medium generally comprises a base material with some coatings useful for optimizing printing and thermal film adhesion. Materials suitable for use as a transparent medium include, but are not limited to: cellulose esters, such as cellulose triacetate, cellulose acetate propionate, or cellulose acetate butyrate; and polyesters, such as polyethylene terephthalate (PET), polyamides, polycarbonates, polyimides, polyolefins, polyesters, or polysulfonamides.

A number of suitable transparent mediums are commercially available from various manufacturers. Just one such example is provided by Premium Inkjet Transparency Film (product no. C3828A) available from the Hewlett-Packard Company of Palo Alto, Calif.

The transparent medium can also include or be coated with materials which increase adhesion of inkjet dyes or pigments, increase the adhesion of the undercoat, optimize image quality, increase resistance to scratches, increase resistance to fading, increase resistance to moisture, increase resistance to UV light. Such materials include, but are not limited to polyesters, polystyrenes, polystyrene-acrylic, polymethyl methacrylate, polyvinyl acetate, polyolefins, poly(vinylethylene-co-acetate), polyethylene-co-acrylics, amorphous polypropylene and copolymers and graft copolymers of polypropylene.

The transparent medium can also influence the level of gloss, the level of matte, the gloss uniformity, or matte uniformity of the undercoated print. For example, a smooth surface on the base material will facilitate good, voidless adhesion of the undercoat, since the film is not required to conform to the topography of an uneven or pitted surface. This will result in a uniformly glossy undercoat surface, one that has good resistance to moisture and increased light fade resistance due to the complete sealing of the surface from air or liquids, especially (but not limited to) water-based liquids or their vapors.

The transparent medium typically comprises a sheet having first and second surfaces in the shape of a square or rectangle, though the shape of the medium is not limited in any way and the size and thickness of the medium can vary. For example, transparent media of the same size and thickness as commonly available printer papers (e.g., letter size, legal size, A4, etc.) can be used. Other embodiments may use carriers suitable for use in large-scale imaging applications, such as applications using the Hewlett-Packard Model 2500 Designjet inkjet printer typically used in engineering, architecture, or cartography applications.

One of ordinary skill in the art will understand that a printed area can be applied to the printable surface of the carrier using commonly known and available means, such as inkjet or electrostatic printing. The printing processes of the present invention can include, but are not limited to, inks conventionally used in inkjet, offset, gravure, and liquid electrophotography. In addition, it includes the imaging means used in electrostatic imaging, and conventional photography. When inkjet printing is used, for example, both dye based and pigment based inkjet inks can be used, but the invention is not limited to such inks.

In the present invention an image is printed on one surface of a transparency film and, generally, the image is viewed through the opposite surface of the film. Therefore, one skilled in the art will understand that "reverse printing" includes printing a mirror image of the image that is to be viewed. The image may be reverse printed to the transparent medium using the means described above. If reverse printing is used, the image may be viewed through the transparent surface of the transparent medium in a correct orientation. If reverse printing is not used, the image orientation may be reversed prior to printing. However, image orientation does not necessarily need to be reversed, depending on the wishes of the user. Additionally, since the image will be viewed through the transparent medium (whereas images of typical prints are viewed directly), care may need to be taken to ensure accurate color reproduction.

If inkjet printing is used, excess moisture from the inks may impede adhesion or uniform dispersion of the undercoat on the printed surface. As long as the media is dry enough for proper adhesion, moisture may dissipate through the undercoat surface over time, since the undercoat is so thin. If excess moisture is trapped between the medium material and the undercoat, the printed image may bloom or blur at its edges. In a preferred embodiment of the present invention, an optimum combination of ink, media and protective undercoat is achieved which minimizes excess moisture in the printing process, thus avoiding accumulations of condensed liquid on the medium. Alternatively, to eliminate such excess moisture, the image may be dried.

An optional dryer can be used to ensure the ink is dry enough to facilitate coating adhesion before undercoating. As non-limiting examples, the dryer can dry the wet image using convection, conduction or irradiation (for example, in a preferred embodiment, with any of the following: a radiative heating apparatus, a conductive heating apparatus, a convective blowing apparatus, an infrared apparatus, an infrared radiative heating element, an ultraviolet apparatus and a microwave apparatus). As long as the media is dry enough for proper adhesion, excess moisture may dissipate through the undercoat surface over time, since the undercoat is so thin.

The printed area may also be preheated prior to coating, to facilitate the transfer of the undercoat material. If a dryer is used, the drying step may provide this preheating.

In a preferred embodiment of the present invention, the heating element used for transfer is selected from a group consisting of a heated roller, a ceramic heat bar, or a thermal printhead. A heated roller, similar to what is used in most commercial laminators or many electrophotograpic printers, provides a good means of providing uniform, continuous, full width transfer of the undercoat. A ceramic heat bar, similar to what is used in many monochrome electrophotographic printers (a.k.a. instant-on fusers), also provides a good means of providing uniform, continuous, full width transfer of the undercoat. In addition, ceramic elements have a lower thermal mass than a typical heated roller, thus they quickly reach the desired transfer temperature and quickly cool following transfer, thereby enhancing energy efficiency and reducing start-up time. A thermal printhead, similar to what is used in thermal transfer, dye sublimation printers or faxes, provides a good means of providing continuous or intermittent, full width or discrete, transfer of the undercoat. The heating element can be rigid, or it may be compressible, with the compression level influencing the nip area.

In another preferred embodiment of the present invention, the medium is positioned over a base, and the heating element and base are pressed towards each other to create a nip area, with a non-stick (non-wetting), heat-resistant surface. A solid lubricant can be used to provide this surface. The solid lubricant may be a fluororesin, fluorocarbon, or fluoropolymer coating such as (poly)-tetrafluoroethylene (PTFE), perfluoroalkoxy (PFA), fluorinated ethylene propylene (FEP), ethylene tetrafluoroethylene (ETFE), ethylene chlorotrifluoroethylene (ECTFE), polyvinylidene fluoride (PVDF), with trade names such as Teflon, Silverstone, Fluoroshield Magna, Cerm-a-lon, Magna TR, Navalon, Apticote, or Edlon. In addition a replenished liquid lubricant, such as silicone oil, can be used to provide this non-stick surface.

In a preferred embodiment of the present invention, the heating element, the base and the donor web span beyond the width of the printable surface of the medium to be coated. During application, the heating element and base maintain a constant nip force and area across the donor web, which is in contact with the medium. Since the donor web and nip area extend beyond the print sides, fall coating to all print edges is insured. The non-stick base surface ensures that the undercoat is only transferred to the printable surface and not to the surrounding non-stick surface of the base. Only that portion of the protective undercoat that touches the printable surface separates from the donor web. The rest, including the undercoat material portion extending beyond the edges of the medium, remains connected to the donor web. The present design also provides the added feature in that one source of undercoat can be used to coat any print size narrower than the source, without the need for post process trimming.

When not being applied, the heating element may be removed from the donor web and base surfaces, thereby discontinuing transfer and allowing form feed of the medium under the heater element. Also, application of the coating can be discontinued by reducing the temperature of the heating element or by reducing the nip force, which can be facilitated by raising the heating element or the combination of the heating element and donor web off the media surface.

Figure 5:
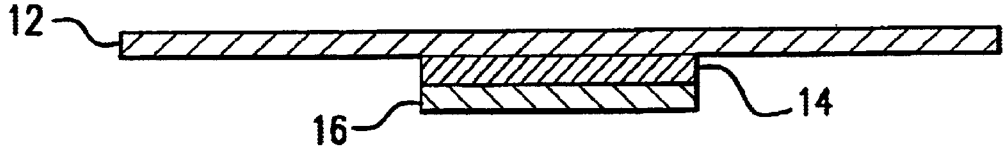
FIG. 5 is a cross sectional view of a preferred embodiment of undercoated print, in which the area of the printable surface with a printed image is undercoated with a thermal transfer material while the area of the printable surface without a printed image is not undercoated.

In addition to limiting the area of transfer of the undercoat to the printable surface by providing a non-stick surface on the base under the printable surface, the area of the printable surface that actually receives a transferred section of the undercoat can be further limited to a specific portion of the printable surface by limiting the section of the undercoat to the area in which heat and pressure is applied. This can be accomplished with the use of a thermal printhead, as used in thermal transfer printers. For example, selected printed areas, such as colored images, on the printable surface can be undercoated while other printed areas, such as black and white text, can remain uncoated. Such an embodiment is shown in FIG. 5. Such selective undercoating of discrete areas on media is not feasible with traditional laminates and traditional laminating processes nor other digital coating processes.

In addition to being an improvement over laminates, the present invention is also an improvement over liquid undercoats, because the undercoat is transferred from a dry ribbon to a dry coating. No wet handling of white inks or paints is required. The white film is pre-formed on the carrier ribbon, so a uniform coating is ensured, unlike the precision spray coating required of a white liquid. Furthermore, a drying step is not required following the application of the thermally transferred protective undercoat, unlike a wet application.

The present invention is also an improvement over using a white toner as an undercoat. The donor web has a pre-formed white film on the carrier, so a uniform coating is ensured, unlike the precision powder application and fusing required with the white toner process. The application process for the thermally transferred protective undercoat is simpler than the toner, as the toner requires a high voltage application step followed by a high temperature fuse step. In contrast, the thermal transfer of the present invention only requires a single step, very similar to the fuse step used with toners. The downside of the present invention compared to toner is that the thermally transferred protective undercoat material may be more expensive than the toner and the donor web also has a waste product, the carrier ribbon, which must be disposed of or recycled.

Also in a preferred embodiment of the present invention, the speed of the donor web through the heating element is maintained at the same speed as the medium, thus ensuring a uniform coverage. A source roll of donor web is located upstream of the heating element and a take-up roll is located downstream. The source roll is torque limited with a slip clutch or similar device to tension and present the protective undercoat material on the donor web, and to allow the unrolling of the donor web concurrent with the medium during application but ensuring that uncontrolled unrolling does not occur. The take-up roll provides enough torque to peel the donor web from the coated medium's surface, but not enough to pull the donor web/medium combination through the applicator or to distort the coating in the applicator. The take-up mechanism thus peels the donor web from the coated medium, collects the donor web, and helps maintain the uniform tension on the donor web during application.

Assuming the printed image on the medium can be dried quickly enough through ink and media optimization or post print dryers, a protective undercoat module can be offered to use, for example, as a plug-in module for a printer. An inkjet printer in combination with a protective undercoat module would provide a compact reliable system for creating durable photo-quality prints. Alternatively, rather than having the protective undercoating capability offered as part of a plug-in module which can either be included or not included with the printer, a printer can be built which completely incorporates the protective undercoating function into an integrated printing and coating printer. Alternatively, a stand-alone coater can be used, which allows the user to hand load the already printed sheets to be undercoated.

Covering the image with a undercoat material offers the advantage of providing an intimate, gap-free bond with the medium, thus protecting the image from the outside environment.

Protective undercoating is an improvement over lamination as previously disclosed. In the present invention a protective undercoat material is transferred onto the medium surface only at the locations that are subjected to the contact pressure and heat. Thus, it disengages from the donor web as it transfers and only the protective undercoat and not the donor web is attached to the medium surface. There is clean separation of the donor web and the medium material at all edges of the print. In contrast, in previously disclosed laminates, the transferred laminate is still attached to the undercoat supply source, until separated by a manual or automated trimming step. In the present invention, there is no need for a secondary manual or automated trimming step to disconnect the thermal undercoat supply source (the donor web) from the undercoated print. This also facilitates the easy feeding of material and clearing of paper jams.

In addition, in the present invention, because the undercoat material separates from the donor web at the media's edges, the alignment of film to media is not as critical as alignment of laminate to media. For example, if a laminate is misaligned, excess material extends beyond the edge of the print, requiring additional post lamination trimming. If a undercoat is misaligned to the media, the undercoat film of the protective undercoat material still separates from the donor web at the edges of the prints and no additional trimming is required.

Another advantage of the undercoats of the present invention is that the undercoats are thinner than most laminates. The differences in the coefficient of thermal expansion between the undercoat and the media will result in less severe curling of thermally transferred undercoated prints as compared to laminated ones. In addition, a thin film provides a more photo-realistic appearance, whereas typical laminates provide a plastic or artificial appearance.

A print of the present invention is illustrated in a cross-sectional view by FIG. 1. The print comprises a transparent medium (2) having first and second surfaces. In FIG. 1, the first surface is the top of the transparent carrier, while the second surface—to which an image is applied—is the side with a printed image (4). The image (4) is applied to the second surface of the medium (2). A thermally transferred undercoat material (6), as disclosed herein, is also applied to the second surface of the medium material (12) and at least partly, but preferably completely, covers the printed image. The image can be viewed through the first surface of the transparent medium (or, if a transparent or translucent undercoat is used, the image can also be viewed through the undercoat). As such, the medium and protective undercoat house and protect the image.

Prints embodied in the present invention can be produced by a variety of apparatuses. Such apparatuses typically comprise the elements illustrated in FIG. 2, though it will be appreciated that other apparatuses may be employed without departing from the scope and true spirit of the present invention.

Figure 2:
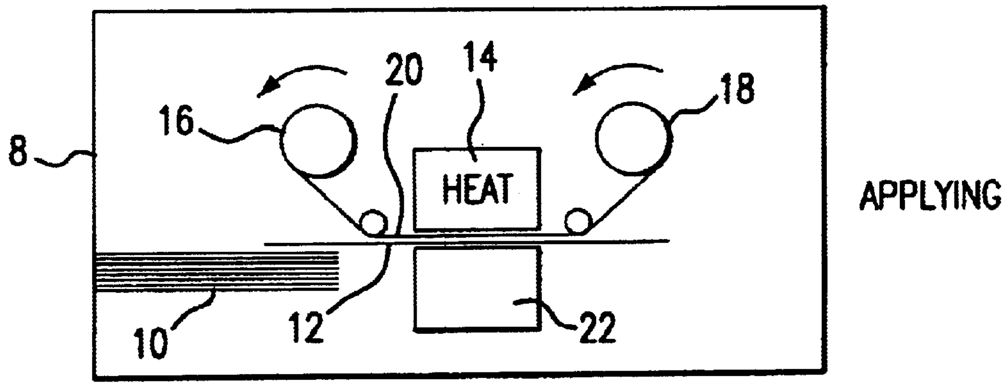
FIG. 2 is schematic view of the apparatus of the present invention, showing a frame (8) housing a loader (10), a sheet of the medium (12), a heating element (14), a source roll (16), a take-up roll (18), a tensioned section of the donor web (20) and a base (22).

The apparatus of FIG. 2 generally comprises a frame (8) housing a loading bin (10). The loader (10) comprises a mechanism similar to known mechanisms for loading paper in printers or photocopiers including, but not limited to, openings for hand-feeding individual sheets of media, a loading bin (10) capable of holding several sheets of media, or combinations thereof.

Once a sheet of the medium material (12) is loaded into the system, the take up roll (18), or other similar means, tensions a section (20) of the donor web coming from the source roll (16), and at least one heating element (14) heats the section of the donor web and presses it against the medium positioned on a base (22) (which in a preferred embodiment can be in the form of at least one roller or a platen) to transfer a segment of the thermal transfer undercoat material layer of the donor web onto the sheet of the medium material (12) as it moves through the system. At the end of the medium (12) the heating element (14) or other similar means, is raised so that it no longer provides heat or pressure to the donor web. The thermally transferred protective undercoat layer separates from the donor web during transfer up to the edges of the medium, with the protective undercoat layer adhering to the surface of the medium where the pressure and heat were applied and continuing to be attached to the donor web beyond the edges of the medium.

Figure 3:
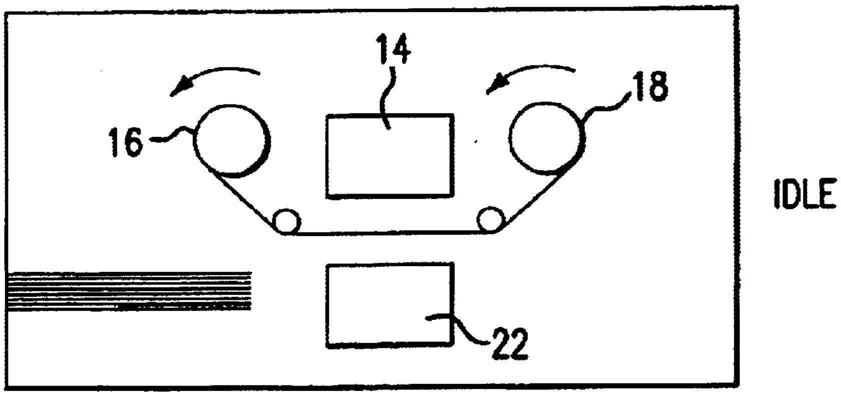
FIG. 3 is an alternate schematic view of the apparatus of FIG. 2 with the ribbon handler (source roll and take-up roll) tensioning the donor web in a position away from the medium.

FIG. 3 shows the apparatus of FIG. 2 with the ribbon handler (e.g. the take-up roll (18) and source roll (16)) tensioning the donor web in a position away from and no longer abutting the heating element (14) and base (22). In this position, no protective undercoat material layer transfers onto a medium.

Figure 4:
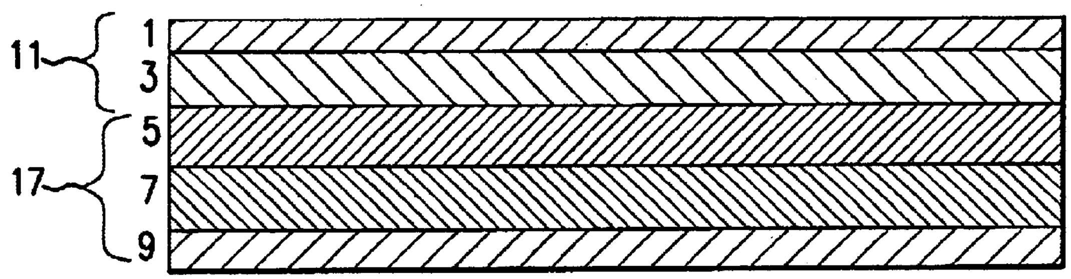
FIG. 4 is a cross sectional view of a preferred embodiment of the donor web of the present invention.

A cross sectional view of a preferred embodiment of the donor web of the present invention is illustrated by FIG. 4. The donor web has a carrier side (11) with lubricant layer (1) and a layer of carrier ribbon material (3) and a transfer side (17) in which the protective undercoat material (7) (which in a preferred embodiment can be a thermoplastic resin, such as an acrylic, polyolefin, polyester and/or their derivatives) itself is sandwiched between a release layer (5) and an adhesive layer (9). The lubricant layer (1) is on the exterior surface of the carrier side (11). The lubricant layer (1) reduces friction between the donor web and the heating element The adhesive layer (9) is on the exterior surface of the transfer side(17) and helps fix the layers of the transfer side (17) as an undercoat on the printable surface of the medium. The release layer (5) is on the interior surface of the transfer side (17) and promotes the release of the layers of the transfer side (17) from adhering to the carrier side (11) to adhering to the printable surface of the medium. In one preferred embodiment, the release layer (5) is wax.

FIG. 5 is a cross sectional view of a preferred embodiment of an undercoated print, in which the area of the printable surface (12) with a printed image (14) is undercoated with a thermally transferred protective layer (16) while the area of the printable surface (12) without a printed image (14) is not undercoated.

Figure 6:
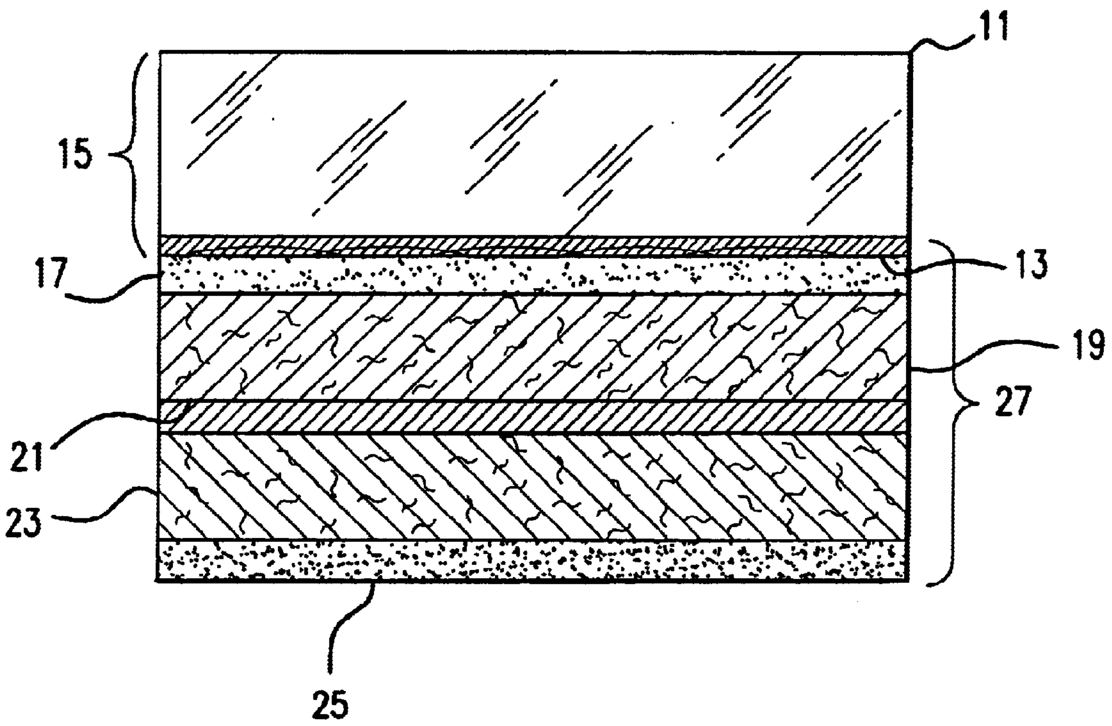
FIG. 6 is a cross-sectional view of an image printed on reverse transparency and undercoated with white matte (in preferred embodiments the matte whitened with colorants such as white ink, bright white ink, off white ink, colored ink and combinations thereof) and metal thermal transfer undercoat.

FIG. 6 is a cross sectional view of a more preferred embodiment of an undercoated print, in which The printed layer (13) on the plastic base (11) together form a printed transparency (15). The under side of the printed transparency (15 is coated with a metallized thermally transferred protective undercoat (27) which begins with an adhesive layer (17) coated directly onto the printed layer (13). Under the adhesive layer (17) is a white matte layer (19) that is directly undercoated with a reflective layer metal (21) (the metal layer in a most preferred embodiment can be aluminum, but other metal coating materials such as silver, indium, zinc, chromium, nickel, gallium, cadmium, palladium, molybdenum and combinations thereof can also be used). The reflective layer metal (21) is undercoated with a protective layer (23). This protective layer is lastly undercoated with a release layer (25) that forms the separating layer between the metallized thermally transferred underlayer (27) and the ribbon carrier layer of the donor web (not shown).

While the present invention is described above in connection with at least one preferred embodiment, it will be readily understood that the scope of the present invention is not intended to be limited to any particular preferred embodiment or embodiments. Instead, this description is intended to cover all alternatives, modifications, and equivalents that may be included within the spirit and scope of the invention as defined by the claims.

What is claimed is:

1. A method of obtaining a protective undercoat on a transparent medium, comprising:

applying an uncut protective undercoat material to the undersurface of the transparent medium, the transparent medium being supported by a base, the uncut protective undercoat material being applied by heat and pressure uniformly to a section of a carrier side or a donor web having a carrier side and a transfer side, the carrier side comprising carrier ribbon material and the transfer side comprising the uncut protective undercoat material, the donor web unrolled from a source roll upstream and taken up by a takeup roll downstream, the source roll and takeup roll tensioning the donor web, and torque from the takeup roll pulling the donor web to release the section of undercoat material adhering to the undersurface of the transparent medium from the carrier ribbon material; and wherein the released section, defined by edges where the heat and pressure are applied, is cleanly separated at the edges from the carrier ribbon material without trimming; and wherein at least a portion of an exterior surface of the base comprises a surface material resistant to undercoat material adhering to the exterior surface.

2. An apparatus comprising:

a donor web having a carrier side comprising carrier ribbon material and a transfer side comprising uncut protective undercoat material, the transfer side applied as an uncut protective undercoat material to a surface of a transparent medium, the donor web being unrolled from a source roll upstream and taken up by a takeup roll downstream, the source roll and takeup roll tensioning the donor web, and torque from the takeup roll pulling the donor web to release the undercoat material adhering to the surface of the transparent medium from the carrier ribbon material, a heating/pressure element to apply the undercoat material to the undersurface of the transparent medium, the heating/pressure element comprising either a surface with a size and shape equivalent to the surface of the transparent medium or at least one heat roller applying heat and force to the whole area of the surface of the transparent medium, the heating pressure element surface or roller applying heat and pressure uniformly to the donor web, the heat and pressure going through the transfer side of the donor web to adhere a section of the undercoat material to the undersurface of the transparent medium, the section of the undercoat material being positioned against the undersurface of the transparent medium and the transparent medium being supported by a base; and wherein the released section, defined by edges where the heat and pressure are applied, is cleanly separated at the edges from the carrier ribbon without trimming; and wherein at least a portion of an exterior of the base comprises a surface material resistant to the undercoat material adhering to the exterior surface.

3. A method of obtaining a protective undercoat on an inkjet printed surface of a transparent medium, comprising:

applying an uncut protective undercoat material to the inkjet printed undersurface of the transparent medium, the undersurface comprising at least one inkjet ink printed image and the transparent medium being supported by a base, the uncut protective undercoat material being applied by heat and pressure uniformly to a section of a carrier side of a donor web having a carrier side and a transfer side, the carrier side comprising carrier ribbon material and the transfer side comprising the uncut protective undercoat material, the donor web unrolled from a source roll upstream and taken up by a takeup roll downstream, the source roll and takeup roll tensioning the donor web, and torque from the takeup roll pulling the donor web to release the section of undercoat material adhering to the undersuface of the transparent medium from the carrier ribbon material; and wherein the released section, defined by edges where the heat and pressure are applied, is cleanly separated at the edges from the carrier ribbon material without trimming; and wherein at least a portion of an exterior surface of the base comprises a surface material resistant to undercoat material adhering to the exterior surface.

4. The method of claim 3, wherein the at least one inkjet ink printed image is printed with water-based ink.

5. The method of claim 3, wherein the at least one inkjet ink printed image is printed with ink selected from the group consisting of dye-based ink and pigment-based ink.

6. The method of claim 3, wherein excess moisture from the at least one inkjet printed image dissipates through the section of undercoat material.

7. The method of claim 3, wherein, before applying the uncut protective undercoat material to the inkjet printed undersurface of the transparent medium, the at least one inkjet ink printed image on the undersurface is dried with a drier selected from the group consisting of a radiative heating apparatus, a conductive heating apparatus, a convective blowing apparatus, an infrared apparatus, an infrared radiative heating element, an ultraviolet apparatus and a microwave apparatus.

8. An apparatus comprising:

a donor web having a carrier side comprising carrier ribbon material and a transfer side comprising uncut protective undercoat material, the transfer side applied as an uncut protective undercoat material to an inkjet printed undersurface of a transparent medium, the donor web being unrolled from a source roll upstream and taken up by a takeup roll downstream, the source roll and takeup roll tensioning the donor web, and torque from the takeup roll pulling the donor web to release the undercoat material adhering to the inkjet printed surface of the transparent medium from the carrier ribbon material, a heating/pressure element to apply the undercoat material to the inkjet printed undersurface of the transparent medium, the heating/pressure element comprising either a surface with a size and shape equivalent to the surface of transparent medium or at least one heat roller applying heat and force to the whole area of the surface of the transparent medium, the heating/pressure element surface or roller applying heat and pressure uniformly to the donor web, the heat and pressure going through the transfer side of the donor web to adhere a section of the undercoat material to the inkjet printed undersurface of the transparent medium, the section of the undercoat material being positioned against the undersurface of the transparent medium and the transparent medium being supported by a base; and wherein the released section, defined by edges where the heat and pressure are applied, is cleanly separated at the edges from the carrier ribbon without trimming; and wherein at least a portion of an exterior surface of the base comprises a surface material resistant to the undercoat material adhering to the exterior surface.

9. The apparatus of claim 8, wherein the at least one inkjet ink printed image is printed with water-based ink.

10. The apparatus of claim 8, wherein the at least one inkjet ink printed image is printed with ink selected from the group consisting of dye-band ink and pigment-based ink.

11. The apparatus of claim 8, wherein excess moisture from the at least one inkjet printed image dissipates through the section of undercoat material.

12. The apparatus of claim 8, wherein, before applying the uncut protective undercoat material to the inkjet printed surface of the transparent medium, the at least one inkjet ink printed image on the undersurface is dried with a drier selected from the group consisting of a radiative heating apparatus, a conductive heating apparatus a convective blowing apparatus, an infrared apparatus, an infrared radiative heating element, an ultraviolet apparatus and a microwave apparatus.

* * * * *

UNITED STATES PATENT AND TRADEMARK OFFICE

CERTIFICATE OF CORRECTION

PATENT NO. : 6,808,583 B2
DATED : October 26, 2004
INVENTOR(S) : Kwasny et al.

It is certified that error appears in the above-identified patent and that said Letters Patent is hereby corrected as shown below:

Column 14,
Line 51, delete “dye-band” and insert therefor -- dye-based --.

Signed and Sealed this

Fifth Day of July, 2005

JON W. DUDAS
*Director of the United States Patent and Trademark Office*